United States Patent [19]

Fitzgerald, Jr.

[11] 3,715,492

[45] Feb. 6, 1973

[54] HIGH VOLTAGE PROTECTION CIRCUIT

[75] Inventor: William Vincent Fitzgerald, Jr., Indianapolis, Ind.

[73] Assignee: RCA Corporation

[22] Filed: May 18, 9171

[21] Appl. No.: 144,458

[52] U.S. Cl. ....................178/7.3 R

[51] Int. Cl. ....................H04n 5/68

[58] Field of Search ..........178/7.3 R, 7.5 R, DIG. 11

[56] References Cited

UNITED STATES PATENTS

| | | | |
|---|---|---|---|
| 3,546,536 | 12/1970 | Umin | 178/7.3 R |
| 3,109,891 | 11/1963 | Molzahn | 178/7.5 R |
| 3,072,741 | 1/1963 | Ahrons et al. | 178/7.5 R |
| 3,270,128 | 8/1966 | Stark | 178/7.5 R |

*Primary Examiner*—Richard Murray
*Attorney*—Eugene M. Whitacre

[57] ABSTRACT

A voltage dependent resistor is cooperatively coupled with a keyed automatic gain control device to provide control signals sufficient to bias off the radio and intermediate frequency amplifier stages of a television receiver when the amplitude of the keying pulse reflects an open-circuiting of a horizontal retrace capacitor which raises the developed high voltage to an excessive level.

5 Claims, 1 Drawing Figure

PATENTED FEB 6 1973 3,715,492
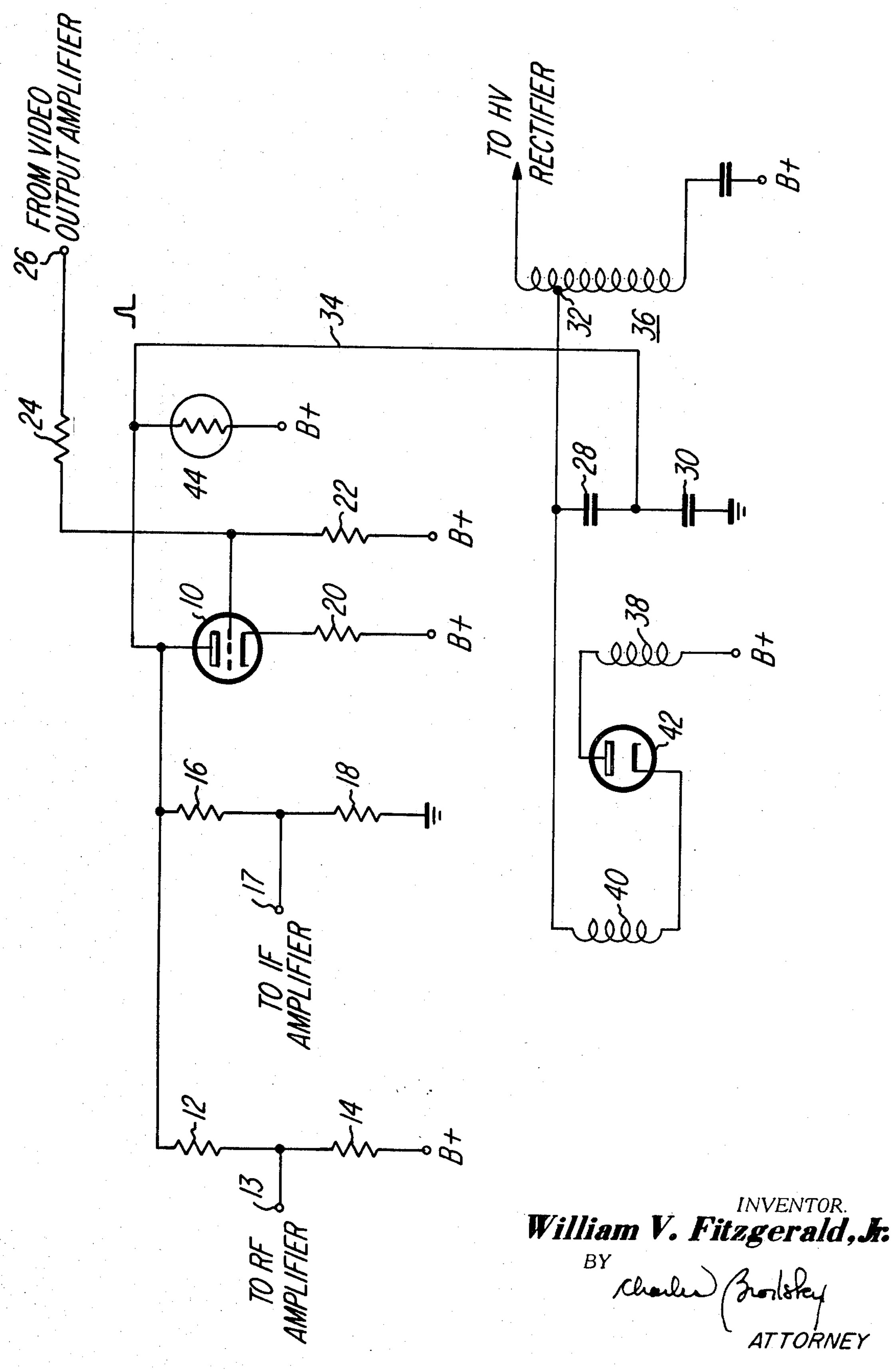
INVENTOR.
William V. Fitzgerald, Jr.
BY
Charles Brodsky
ATTORNEY

HIGH VOLTAGE PROTECTION CIRCUIT

FIELD OF THE INVENTION

This invention relates to television receivers, in general, and to a circuit arrangement for blanking the face of its picture tube and muting its sound to indicate the presence of a possible X-radiation problem, in particular.

SUMMARY OF THE INVENTION

As will become clear hereinafter, the circuit of the invention senses a particular operating condition in the receiver as indicative of the functioning of the high voltage apparatus. A voltage dependent resistor is incorporated in the automatic gain control stage to sense such changes in an applied keying pulse as indicates the development of increasing high voltage. Where the keying pulse is taken from a capacitor which forms part of the horizontal retrace circuitry of the receiver, its open-circuiting would shorten the retrace time—thereby raising the high voltage developed for the picture tube—but would also increase the amplitude of the pulse. An increase in amplitude of such magnitude as would reflect a rise in high voltage to a level at which X-radiations could occur causes the voltage dependent device to conduct in a manner which establishes it as the primary source in developing the automatic control voltage, rather than the automatic gain control device itself. The direct voltage so developed once this magnitude is reached is applied to bias off the radio and intermediate frequency amplifier stages of the receiver and inhibit the reproduction of the transmitted video and sound information. This then signals the presence of the open-circuit fault condition to the viewer and warns him that X-radiations could be emanating at a dangerous level.

Such protection circuit will therefore be seen similar to those described in pending U.S. Pat. applications, Ser. Nos. 103,713 (RCA 64,214) and 121,250 (RCA 64,482)—both assigned to the same assignee as is the invention of this disclosure—in rendering the reproduced picture unviewable under conditions of excessive high voltage. The first of these two applications describes a circuit which changes the operating frequency of the horizontal oscillator when the peak-to-peak signal applied to its high voltage multiplier exceeds a prescribed limit. The second of these applications describes a circuit which senses the loss of high voltage regulation, and response by also changing the frequency of the horizontal oscillator. As with the circuit of the instant specification, the result is to provide an indication of increasing levels of possible X-radiation, and to enable corrective measures to be taken as a necessary repair.

BRIEF DESCRIPTION OF THE DRAWING

These and other advantages of the present invention will be more clearly understood from a consideration of the single FIGURE of the drawing showing, in schematic form, a high voltage protection circuit constructed in accordance with the invention.

DETAILED DESCRIPTION OF THE DRAWING

In the drawing, the automatic gain control device of the receive is illustrated as a triode type vacuum tube 10, although transistor devices might alternatively be used. A first pair of resistors 12, 14 couple the plate of tube 10 to a source of B+ potential, while a second pair of resistors 16, 18 couple that same electrode to a point of reference or ground potential. A further resistor 20 couples the cathode of the tube 10 to the B+ potential source, to which one end of another resistor 22 is also coupled, the other end being returned to the grid of the amplifying valve. An additional resistor 24 is included to couple a video output signal terminal 26 to the grid to tube 10, and thereby forms a signal divider network along with the resistor 22. Lastly, a pair of capacitors 28, 30 are serially coupled between a horizontal flyback pulse terminal 32 and ground, with the junction between the two capacitors being directly connected via a lead 34 to the late of the triode tube 10. Such terminal 32 may typically comprise a tap on a horizontal output transformer 36 of the receive, with the positive-going flyback pulse provided at the junction of capacitors 28, 30 then being used to key the triode 10 into operation during the positive sync tip portion of the applied video signal. With the junction 13 of resistors 12, 14 being coupled to apply a first gain control signal to the radio frequency amplifier stage and with the junction 17 of resistors 16, 18 being coupled to apply a second such signal to the intermediate frequency amplifiers in appropriate manners, the negative direct voltages which are there developed then regulate the respective amplifications of these stages in known fashion in the presence of varying signal strengths.

The circuit of the invention as thus far described is known in the prior art, in both color and monochrome television receiver designs. Its use in a CTC-31 color chassis manufactured by the RCA Sales Corporation is illustrated in its Color Television Service Data Note, File 1967-No.T19. Its use in the KCS-175 monochrome receiver of that corporation is illustrated in its Television Service Date Note, File 1968-No.T13.

Should capacitor 30 open-circuit, however, the amplitude of the keying pulse applied to the plate of tube 10 will substantially increase in magnitude due to the loss of its signal divider action along with capacitor 28. Consequently, the control voltage developed at the junction of resistors 12 and 14 will increase somewhat, as will the control voltage developed at the junction of resistors 16 and 18. More importantly, though, is the fact that the retrace interval of the horizontal deflection waveshape will be shortened by the absence of this capacitor 30—this follows because each retrace time is essentially governed by the resonant frequency of capacitors 28, 30 in conjunction with the joke inductance of the receiver (not shown) and, as will be appreciated, will result in an ultimate increase in the direct voltage developed for the cathode-ray kinescope of the receiver by an appropriate high voltage rectifier to a level at which X-radiation problems may occur.

To reduce this possibility—and in accordance with the teachings of the present invention—a voltage dependent resistor 44 is coupled between the plate of the vacuum tube 10 and the source of B+ potential. By selecting the device 44 of such characteristics that it does not readily conduct current for keying pulse amplitudes which are provided during normal circuit operation, it will first be seen that its effect on the overall regulation of the automatic gain control stage will be minimal when the signal division of the capacitive elements 28, 30 is present. By further selecting the characteristics of the dependent deice 44 so that it will substantially conduct current once the amplitude of the keying pulse reaches that magnitude which reflects the open-circuiting of capacitor 30 and the resulting increase in developed high voltage to an excessive level, it will also be seen that the resulting current conduction through the device 44 will establish a significantly lower direct voltage at the plate of the tube 10 and, correspondingly, significantly lower direct voltages at the junctions 13, 17, of the resistance dividers 12, 14 and 16, 18, respectively. By selection of the characteristics for the voltage dependent resistor 44 in view of the expected increase in amplitude of the keying pulse in the absence of the capacitor 30 and, also, in view of the specific voltage divider ratios selected for resistors 12, 14 and resistors 16, 18, the direct voltages so developed at terminals 13, 17 during this fault condition can be made of such negative value as will bias off the radio and intermediate frequency amplifier stages and both blank the reproduced picture and mute its sound. Such disabling, then, would provide the requisite indication of the high voltage fault and would direct the need for corrective service action to be taken.

It will thus be seen that this circuit construction operates in compliance with recent regulations set down in United States television manufacture design respecting high voltage performance. Such regulations call for an indication of any X-radiation problem which might arise whenever any component of the receiver either open-circuits or short-circuits. As is well known, these occurences oftentimes develop during the manufacture of the receiver chassis and, also, as the receiver components age with operation. With the circuit of the present invention, it will be noted that any open-circuiting of capacitor 30—caused either by its aging, through defects in its manufacturing process, or through its improper insertion into the circuits of the receiver—will result in the requisite indication that dangerous X-rays might be emanating from the receiver at that particular time.

While there has thus been described what is considered to be a preferred embodiment of the present invention, it will be readily apparent that other modifications may be made by those skilled in the art, without departing from the spirit of the teachings herein. It is therefore contemplated that this intention of providing an indication of such capacitive fault as would increase the developed high voltage of the receiver be understood in any reading of the appended claims.

What is claimed is:

1. In an automatic gain control circuit of the type in which direct voltages are developed for controlling the bias on the radio and intermediate frequency amplifier stages of a television receiver in response to the application of a horizontal flyback pulse to an included amplifier device during a prescribed portion of an additionally applied video signal, and further of the type wherein said flyback pulse is provided from a capacitive impedance network which is operative in determining the retrace period of the horizontal deflection waveform for said receiver and is of an amplitude indicative of the high voltage provided in said receiver, the combination therewith of:

a voltage dependent resistor; and means coupling said voltage dependent resistor in circuit with an output electrode of said amplifier device and to additionally receive said provided flyback pulse from said capacitive impedance network;

with said resistor being characterized by a first exhibited impedance characteristic for applied flyback pulse amplitudes from said capacitive impedance network up to a predetermined magnitude indicative of desired high voltage operation and a second such characteristic for applied flyback pulse amplitudes from said network beyond said magnitude and indicative of undesired high voltage operation, such that insufficient current flow through said resistor on said lower magnitude pulses to substantially affect the level of direct voltages developed at said output electrode for controlling the bias on said amplifier stages and such that sufficient current flows therethrough on said higher magnitude pulses to substantially affect the level of said developed direct voltages, during which time said voltage dependent resistor operates as the primary source of automatic gain control for said amplifier stages to reduce their conductivities upon recognition of said undesired high voltage operation.

2. The combination of claim 1 wherein said voltage dependent resistor is characterized by a second exhibited impedance characteristic for applied flyback pulse amplitudes beyond said predetermined magnitude such that sufficient current flow therethrough on said pulses to control the level of said developed direct voltages to magnitudes sufficient to bias off said radio and intermediate frequency amplifier stages.

3. The combination of claim 1 for use with an automatic gain control circuit of the type there specified, wherein said flyback pulse is provided at the junction of a pair of serially coupled capacitors in circuit arrangement characterized by causing a decrease in said horizontal retrace period and a resulting increase in the high voltage generated within said television receiver upon the open-circuiting of one thereof, and wherein said voltage dependent resistor coupling means couples said resistor to the junction of said capacitors to sense said increase in high voltage as reflected by the increase in flyback pulse amplitude resulting at said junction due to loss of signal divider action in generating said flyback pulse from an applied pulse of greater amplitude as is caused by said serially coupled capacitor open-circuiting.

4. The combination of claim 1 for use with an automatic gain control circuit of the type there specified, wherein said flyback pulse is applied between the input and said output electrodes of said amplifier device and said video signal is applied between the control and input electrodes thereof, and wherein said voltage dependent resistor coupling means couples said resistor substantially in shunt with said device to effectively decrease the level of said direct control voltages developed at said output electrode upon said predetermined flyback pulse magnitude being exceeded.

5. An automatic gain control circuit for a television receiver comprising:

an amplifying device having input, output ad control electrodes;

a source of operating potential;

a point of reference potential;

first and second resistors serially coupling said output electrode to said operating potential source;

third and fourth resistors serially coupling said output electrode to said reference potential point;

a fifth resistor coupling said input electrode to said operating potential source;

first, second, third and fourth terminals;

sixth and seventh resistors serially coupling said first terminal to said operating potential source, with the junction therebetween being coupled to the control electrode of said amplifying device;

a voltage dependent resistor coupling the output electrode of said device to said operating potential source and exhibiting different impedance characteristics as a function of signal amplitude applied thereacross;

first means coupling said second terminal between the junction of said first and second resistors and a first amplifier stage whose signal gain is to be controlled;

second means coupling said third terminal between the junction of said third and fourth resistors and a second amplifier stage whose signal gain is also to be controlled;

third means coupling said fourth terminal to the output electrode of said amplifying device;

and fourth means coupling said first terminal to a source of video signals;

whereby with horizontal flyback pulses of a first amplitude range being supplied at said fourth terminal in time synchronism with a prescribed portion of the video signal supplied at said first terminal, direct voltage levels of a first magnitude range are developed at said second and third terminals primarily under the control of said amplifying device and whereby with horizontal flyback pulses being supplied at said fourth terminal at amplitudes beyond said range, direct voltage levels of a different magnitude range are developed at said second and third terminals primarily under the control of said voltage dependent resistor then operating in accordance with its dissimilar impedance characteristic.

* * * * *